United States Patent
Fraczek

(10) Patent No.: US 10,306,048 B2
(45) Date of Patent: May 28, 2019

(54) ELECTRONIC DEVICE AND METHOD OF CONTROLLING NOISE BY USING ELECTRONIC DEVICE

(71) Applicant: SAMSUNG ELECTRONICS CO., LTD., Suwon-si (KR)

(72) Inventor: Roman Fraczek, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 15/193,678

(22) Filed: Jun. 27, 2016

(65) Prior Publication Data
US 2017/0201616 A1    Jul. 13, 2017

(30) Foreign Application Priority Data
Jan. 7, 2016    (KR) .................. 10-2016-0002091

(51) Int. Cl.
| H04M 1/725 | (2006.01) |
| H04W 4/02 | (2018.01) |
| H04B 1/3827 | (2015.01) |
| H04W 68/00 | (2009.01) |

(52) U.S. Cl.
CPC ........ *H04M 1/72533* (2013.01); *H04B 1/385* (2013.01); *H04W 4/026* (2013.01); *H04W 4/027* (2013.01); *H04W 68/005* (2013.01)

(58) Field of Classification Search
CPC ........... H04M 1/7253; H04M 1/72533; H04M 1/72583; H04M 2250/12; H04B 1/385; H04B 1/3866; H04W 4/026; H04W 4/027; H04W 68/005; A61B 5/224
See application file for complete search history.

(56) References Cited

U.S. PATENT DOCUMENTS

| 4,110,583 | A  | 8/1978  | Lepper |
| 5,717,767 | A  | 2/1998  | Inanaga et al. |
| 5,737,433 | A  | 4/1998  | Gardner |
| 6,041,126 | A  | 3/2000  | Terai et al. |
| 6,343,130 | B2 | 1/2002  | Yamazaki |
| 7,809,160 | B2 | 10/2010 | Vertegaal et al. |
| 7,936,887 | B2 | 5/2011  | Smyth |
| 8,045,726 | B2 | 10/2011 | Kimura |

(Continued)

FOREIGN PATENT DOCUMENTS

| EP | 2690407 A1    | 1/2014 |
| WO | 0195666 A2    | 12/2001 |
| WO | 2014016723 A2 | 1/2014 |

OTHER PUBLICATIONS

Eadicicco Lisa, "Apple Patents Smart Earbuds to Track Steps and Detect Head Gestures", tom's guide, Feb. 18, 2014, http://www.tomsguide.com/us/apple-patent-smart-earbuds-2014,news-18324.html, (8 pages total).

*Primary Examiner* — Thanh C Le
(74) *Attorney, Agent, or Firm* — Sughrue Mion, PLLC

(57) ABSTRACT

A method of controlling noise using an electronic device and the electronic device are provided. The method includes: determining a main work space of a user; determining at least one among a facing direction of the user and a rotating speed of the user; sensing noise around the user; and providing the wearable device with a sound for offsetting the sensed noise based on at least one among the determined main work space, the facing direction of the user, and the rotating speed of the user.

18 Claims, 10 Drawing Sheets

(56) References Cited

U.S. PATENT DOCUMENTS

| | | |
|---|---|---|
| 8,553,897 B2 | 10/2013 | Anderson |
| 8,655,004 B2 | 2/2014 | Prest et al. |
| 8,781,142 B2 | 7/2014 | Olafsson et al. |
| 9,182,819 B2 | 11/2015 | Strupczewski et al. |
| 9,706,962 B1 * | 7/2017 | Uehara .................. A61B 5/224 |
| 2001/0046304 A1 | 11/2001 | Rast |
| 2002/0141597 A1 | 10/2002 | Wilcock |
| 2002/0141599 A1 | 10/2002 | Trajkovic et al. |
| 2003/0061032 A1 | 3/2003 | Gonopolskiy |
| 2008/0130908 A1 | 6/2008 | Cohen et al. |
| 2012/0114132 A1 | 5/2012 | Abrahamsson et al. |
| 2012/0237049 A1 | 9/2012 | Brown et al. |
| 2013/0259244 A1 | 10/2013 | Christensen |
| 2014/0025287 A1 | 1/2014 | Christensen |
| 2015/0194144 A1 | 7/2015 | Park et al. |
| 2016/0047840 A1 * | 2/2016 | Kobayashi ............ H04W 4/027 702/147 |
| 2016/0098138 A1 * | 4/2016 | Park .................... H04M 1/7253 345/173 |

* cited by examiner

ELECTRONIC DEVICE AND METHOD OF CONTROLLING NOISE BY USING ELECTRONIC DEVICE

CROSS-REFERENCE TO RELATED APPLICATION

This application claims priority from Korean Patent Application No. 10-2016-0002091, filed on Jan. 7, 2016, in the Korean Intellectual Property Office, the disclosure of which is incorporated herein by reference in its entirety.

BACKGROUND

1. Field

Methods and apparatuses consistent with exemplary embodiments relate to controlling noise by using an electronic device, and more particularly, to controlling noise in a work place where a user works, studies, or the like.

2. Description of Related Art

As technologies develop and society becomes more complicated, people are increasingly surrounded by sound. This surrounding sound is referred to as a soundscape. However, most surrounding sounds are merely noise that lower work efficiency and disturb rest.

Therefore, various attempts are being made to control or interrupt surrounding noise so as to increase user work or learning efficiency. However, particular soundproof facilities are needed to control or interrupt such noise, which are excessively costly, and a vital sound that is to be transmitted to the user may also be interrupted (e.g., a voice of a superior officer or a colleague attempting to have a conversation with the user at work may also be interrupted).

SUMMARY

One or more exemplary embodiments provide an electronic device that divides a space, to which a user belongs, into a main work place and other spaces according to a preset criterion and provides a wearable device with a sound for removing surrounding noise and a method of controlling noise by using the electronic device.

Further, one or more exemplary embodiments provide an electronic device that outputs a sound for offsetting surrounding noise according to a work state of a user through a wearable device and a method of controlling noise by using the electronic device.

Further still, one or more exemplary embodiments provide an electronic device that provides an alarm to a user if a sound is received from a space set to a sub work space according to a preset criterion and a method of controlling noise by using the electronic device.

According to an aspect of an exemplary embodiment, there is provided a method of controlling noise by an electronic device, the method including: determining a main work space of a user; determining at least one among a facing direction of the user and a rotating speed of the user; sensing noise around the user; and providing a sound for offsetting the sensed noise based on at least one among the determined main work space, the facing direction of the user, and the rotating speed of the user.

The determining may include determining a space within a preset range in the facing direction of the user as the main work space.

The determining the main work space may include: receiving a user input for setting the main work space; and determining the main work space based on the user input.

The method may further include determining a work state of the user based on at least one among the facing direction of the user and the rotating speed of the user.

The method may further include determining whether to output the sound for offsetting the sensed noise based on the determined work state of the user.

The method may further include receiving a user input setting a sub work space.

The method may further include: outputting an alarm in response to a sub work space sound being generated in the sub work space.

The method may further include: sensing a sound using a plurality of microphones attached to a wearable device or the electronic device; and determining whether the sensed sound is the sub work space sound.

The outputting the alarm may be performed in response to determining the sensed sound is the sub work space sound.

The method may further include requesting an output of the sound for offsetting the sensed noise from an external device.

According to an aspect of another exemplary embodiment, there is provided electronic device for controlling noise, the electronic device including: a microphone configured to sense noise around the user; a processor configured to determine a main work space of a user, determine at least one selected from a facing direction of the user and a rotating speed of the user, and generate a sound for offsetting the sensed noise based on at least one selected from the determined main work space, the facing direction of the user, and the rotating speed of the user; and a communicator configured to transmit the generated sound to a wearable device.

The processor may determine the main work space as a space within a preset range in the facing direction of the user.

The electronic device may further include: a user input unit configured to receive a user input for setting the main work space, and the processor may determine the main work space based on the user input.

The processor may determine a work state of the user based on at least one among the facing direction of the user and the rotating speed of the user.

The processor may determine whether to output the sound offsetting the sensed noise based on the determined work state of the user.

The electronic device may further include: a user input unit configured to receive a user input setting a sub work space.

The communicator may be further configured to transmit a signal outputting an alarm to the wearable device in response to a sub work space sound being generated in the sub work space.

The electronic device may further include: a plurality of microphones configured to sense the sound generated in the sub work space, and the processor may be further configured to determine whether the sensed sound is the sub work space sound.

The communicator may transmit the signal outputting an alarm to the wearable device in response to determining the sensed sound is the sub work space sound.

The communicator may request an output of the sound for offsetting the sensed noise from an external device.

According to an aspect of still another exemplary embodiment, a non-transitory computer medium has recorded thereon a program for executing a method of controlling noise in a work space of a user using an electronic device, the method including: determining a main work space of the user; determining at least one among a facing direction of the user and a rotating speed of the user; sensing noise around the user; and providing a sound for offsetting the sensed noise based on at least one among the determined main work space, the facing direction of the user, and the rotating speed of the user in a computer.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
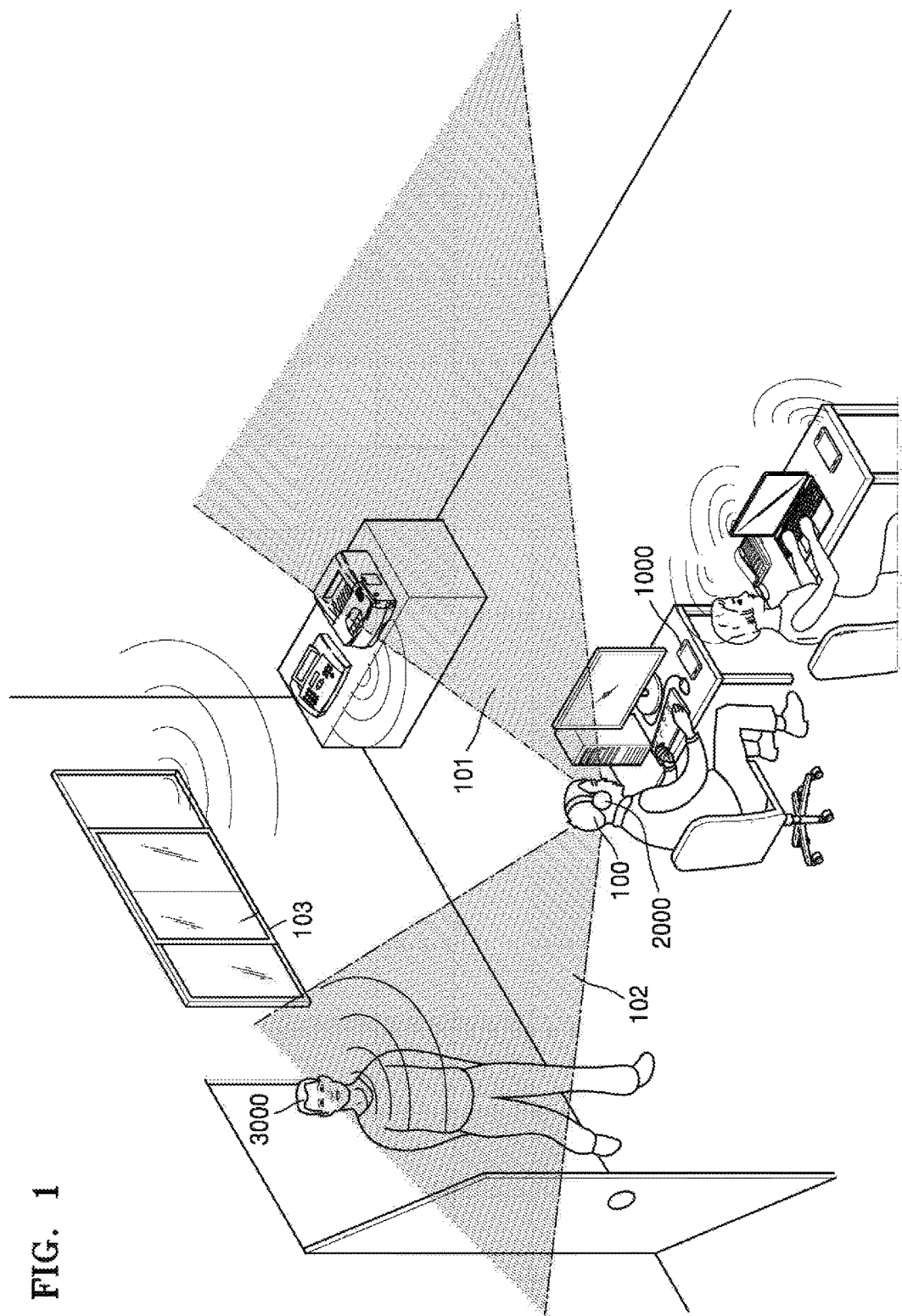
FIG. 1 illustrates a method of controlling noise by using an electronic device according to an exemplary embodiment.

Reference will now be made in detail to various exemplary embodiments, aspects of which are illustrated in the accompanying drawings, wherein like reference numerals refer to like elements throughout. In this regard, exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used herein are general terms that are currently widely used in consideration of functions in the example embodiments but may vary according to intentions of those of ordinary skill in the art, precedents, appearances of new technologies, or the like. Also, the applicant may arbitrarily select terms in a particular case, and meanings of the terms corresponding to this case will be described in detail in the description of the present invention. Therefore, the terms used herein may be defined based on meanings thereof and the overall contents of the example embodiments not based on names of simple terms.

Although the terms first, second, etc. may be used herein to describe various elements, these elements may not be limited by these terms. These terms are merely used to distinguish one element from another element.

The terminology used herein is for describing particular embodiments merely and is not intended to be limiting of embodiments. The singular forms are intended to include the plural forms as well unless the context clearly indicates otherwise. Also, when an element is referred to as being "connected" to another element, it may be "directly connected" or "electrically connected" to another element, and intervening elements may be present. When a part "comprises" an element, this may mean that the part may not exclude and may further include other elements as long as there is no contrary description.

The terms "the" and "a," as used in the present specification, are demonstrative. Particularly, in claims, "the" and "a" may indicate both singular and plural forms. Also, if there is no description clearly designating orders of operations describing a method, described operations may be performed in appropriate orders. The present disclosure is not limited by described orders of operations.

The words "some embodiments or "an embodiment" appearing in various places of the present specification do not necessarily indicate all the same embodiments.

Some exemplary embodiments of the present disclosure may be represented with functional block structures and various types of processing operations. Some or all of functional blocks may be embodied as any number and combination of hardware and/or software elements that execute particular functions. For example, the functional blocks may be embodied by one or more microprocessors by circuit elements. Also, the functional blocks may be embodied by various programming or scripting languages. The functional blocks may be embodied as algorithms that are executed by one or more processors. Also, an existing technology may be used for electronic configuring, signal processing, and/or data processing. The terms such as "mechanism", "element", "means", and "structure" may be widely used and are not limited as mechanical and physical structures.

Also, connection lines or connection members between elements illustrated in drawings exemplarily indicate functional and/or physical or circuit connections. In an actual device, connections between elements may be replaced or may be indicated through additional various functional connections, physical connections, or circuit connections.

A main work space used herein may be a space in a preset range located in a facing direction of a face of a user when the user performs a work, learning, or the like in a space to which the user belongs. If the face of the user heads toward a space included in the main work space, an electronic device 1000 may provide a sound for offsetting noise around the user to a wearable device 2000 worn by the user.

Also, a sub work space may be a part of a space except the main work space in the space to which the user belongs, and the user may receive a sound generated in the sub work space. For example, the sub work space may be a space where a superior officer giving an instruction to the user or a colleague performing a joint work at work is located.

Also, a work state refers to a state of the user who performs a preset work, e.g., may include a main work state, a sub work state, and a rest state. A determination may be made as to whether the user is in the main work state, according to whether the face of the user heads toward the main work space. The main work state may include a state in which the user performs a work, learning, or the like. A determination may be made as to whether the user is in the sub work state according to whether the face of the user heads toward the sub work space or according to a speed at which the user rotates the face toward the sub work space. For example, the sub work state may include a state in which the user has a conversation with a superior officer or a colleague. A determination may be made as to whether the user is in the rest state, according to whether the face of the user heads toward a space except the main work space and the sub work space or according to a speed at which the user rotates the face toward a space except the main work space and the sub work space. For example, the rest state may include a state in which the user looks out a window to take a rest.

The wearable device 2000 may include earphones, a headphone, a head-mounted device (HMD), or the like that may receive an output signal from the electronic device 1000 to output a sound to the user. However, this is merely an exemplary embodiment, and the wearable device 2000 is not limited thereto.

Also, an external device is a device that is located outside an electronic device. The external device may receive a sound output signal for offsetting noise from the electronic device 1000 and output the sound output signal to the user. The external device is not limited thereto but may be a device that may sense surrounding noise to produce and output a sound for offsetting noise around the user according to a work state of the user.

Noise data may be data that is generated by sensing surrounding noise by the electronic device 1000. The electronic device 1000 may generate a sound for offsetting noise by using an active noise control method. The active noise control method refers to a method of generating and outputting a sound having an opposite phase to a surrounding noise waveform to offset a signal of surrounding noise. However, a method of controlling noise through the electronic device 1000 is not limited to the active noise control method, and thus the electronic device 1000 may control noise around the user by using various types of algorithms or methods.

Sound data may be data that is generated based on a sound sensed through a plurality of microphones 1620 of the electronic device 1000 or a plurality of microphones of the wearable device 2000. The electronic device 1000 may analyze the sound data to determine a direction from which the sound is generated.

The present disclosure will now be described in detail with reference to the attached drawings.

FIG. 1 illustrates a method of controlling noise through the electronic device 1000, according to an exemplary embodiment.

FIG. 1 illustrates a method of controlling noise through the electronic device 1000 when a user 100 performs a work in a work space. Referring to FIG. 1, a face of the user 100 heads toward a space set to a main work space 101. If the face of the user 100 heads toward the main work space 101, the electronic device 1000 may determine a work state of the user 100 as a main work state. If the user 100 is in the main work state, the electronic device 1000 may sense a sound (e.g., a typing sound of another worker, an operating sound of a printer, a phone's bell sound, noise coming from an outside of the work space, or the like) in a work space to which the user 100 belongs, to generate noise data. The electronic device 1000 may generate a sound having an opposite phase to surrounding noise and provide the sound to the wearable apparatus 2000 worn by the user 100. For example, the electronic device 1000 may change merely a phase of the noise data into an opposite phase to generate a sound for removing surrounding noise. The wearable device 2000 may receive the sound from the electronic device 1000 and output the sound to the user 100.

If a sound is received from a space set to a sub work space 102, the electronic device 1000 may transmit a signal for outputting an alarm to the wearable device 2000 worn by the user 100. For example, if a superior officer 3000 of the user 100 talks to the user 100 in a space belonging to the sub work space 102, the electronic device 1000 may transmit the signal for outputting the alarm to the wearable device 2000. The wearable device 2000 may receive the signal for outputting the alarm from the electronic device 1000 and output an alarm notifying about that a sound is generated in the sub work space 100, to the user 100. Also, the electronic device 1000 may transmit a signal for controlling to stop outputting a sound for removing surrounding noise to the wearable device 2000 so as to enable the user 100 to hear the sound generated in the sub work space 102.

If the face of the user 100 heads toward a space 103 except the spaces set to the main work space 101 and the sub work space 102, the electronic device 1000 may determine the work state of the user 100 as a rest state. If the work state of the user 100 is determined as the rest state, the electronic device 1000 may transmit the signal for controlling to slowly stop outputting the sound for removing the surrounding noise to the wearable device 2000.

Figure 2:
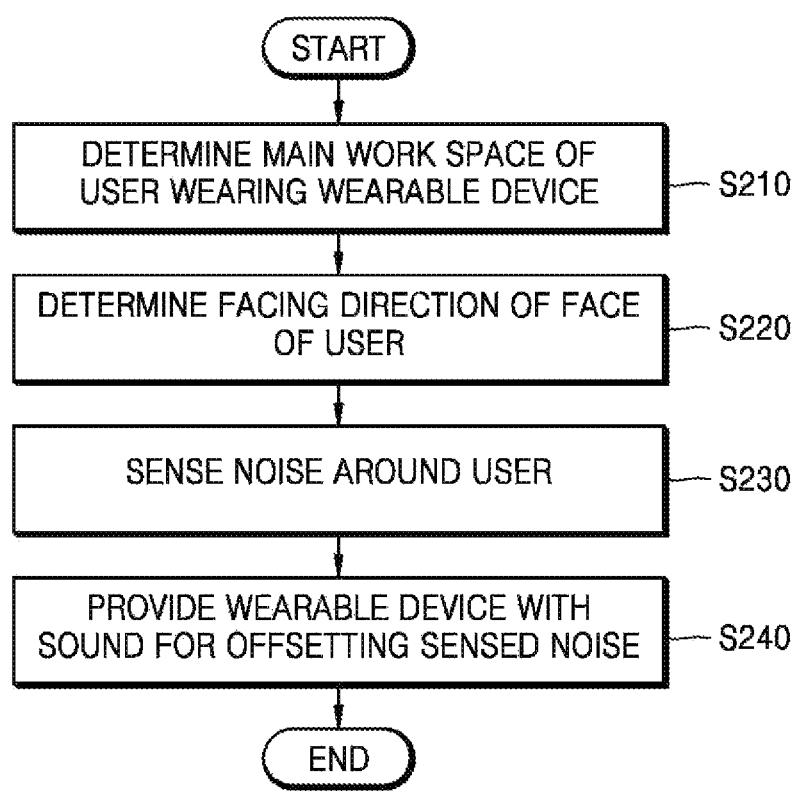
FIG. 2 is a flowchart of a method of controlling noise in a work space by using an electronic device, according to an exemplary embodiment.

FIG. 2 is a flowchart of a method of controlling noise in a work space through the electronic device 1000, according to an exemplary embodiment.

In operation S210, the electronic device 1000 may determine the main work space 101 of the user 100 who wears the wearable device 2000. The electronic device 1000 may analyze a direction (hereinafter referred to as a facing direction) toward which the face of the user 100 heads for a preset time to determine the main work space 101. The electronic device 1000 may receive a user input for setting the main work space 101 through a user input unit 1100. The electronic device 1000 may set the main work space 101 based on the received user input.

In operation S220, the electronic device 1000 may determine the facing direction of the face of the user 100. The wearable device 2000 that the user 100 may wear on a head may include a sensor 2020 that may sense the facing direction of the face of the user 100. The wearable device 2000 may include a gyroscope sensor 2021 and an acceleration sensor 2022.

The wearable device 2000 may receive a sensing signal of the facing direction of the face of the user 100 from the gyroscope sensor 2021 or the acceleration sensor 2022 and transmit the sensing signal to the electronic device 1000. The electronic device 1000 may analyze the sensing signal received from the wearable device 2000 to determine the facing direction of the face of the user 100. However, the wearable device 2000 is not limited thereto and thus may analyze the sensing signal by itself without transmitting the sensing signal to the electronic device 1000 so as to determine the facing direction of the face of the user 100.

The wearable device 2000 may also include a camera 2023. The wearable device 2000 may capture a space toward which the face of the user 100 heads, by using the camera 2023. The wearable device 2000 may transmit a captured image to the electronic device 1000. The electronic device 1000 may determine the main work space 101 of the user 100 based on the received captured image.

In operation S230, the electronic device 1000 may sense surrounding noise. The electronic device 1000 may include a microphone 1620. The electronic device 1000 may sense noise around the user 100 to generate noise data by using the microphone 1620. However, the electronic device 1000 is not limited thereto, and thus a microphone included in the wearable device 2000 may receive noise data, which is generated by sensing noise around the user 100, from the wearable device 2000. The electronic device 1000 may analyze the noise data to generate a sound for offsetting the noise around the user 100. The sound may include a signal having a different phase from a signal of the noise around the user 100.

In operation S240, the electronic device 1000 may provide the wearable device 2000 with the sound for offsetting the sensed noise. The electronic device 1000 may transmit the sound, which is generated by analyzing the noise data, to the wearable device 2000. The wearable device 2000 may output the sound received from the electronic device 1000 to the user 100 so as to offset the noise around the user 100. The electronic device 1000 may transmit the sound to an external device (e.g., a speaker located in a space to which the user 100 belongs) not to the wearable device 2000. The external device may output the sound received from the electronic device 1000 to offset the noise around the user 100.

The electronic device 1000 may determine the main work space 101 from a work space to which the user 100 belongs and, if the face of the user 100 heads the main work space 101, control the surrounding noise. The electronic device 1000 may determine the main work space 101 to control noise in a space without separating a physical space from the space to which the user 100 belongs. The electronic device 1000 may also simply change the main work space 101, and thus a noise control may be performed at more flexible and lower cost than a noise control method according to a physical space separation.

Figure 3:
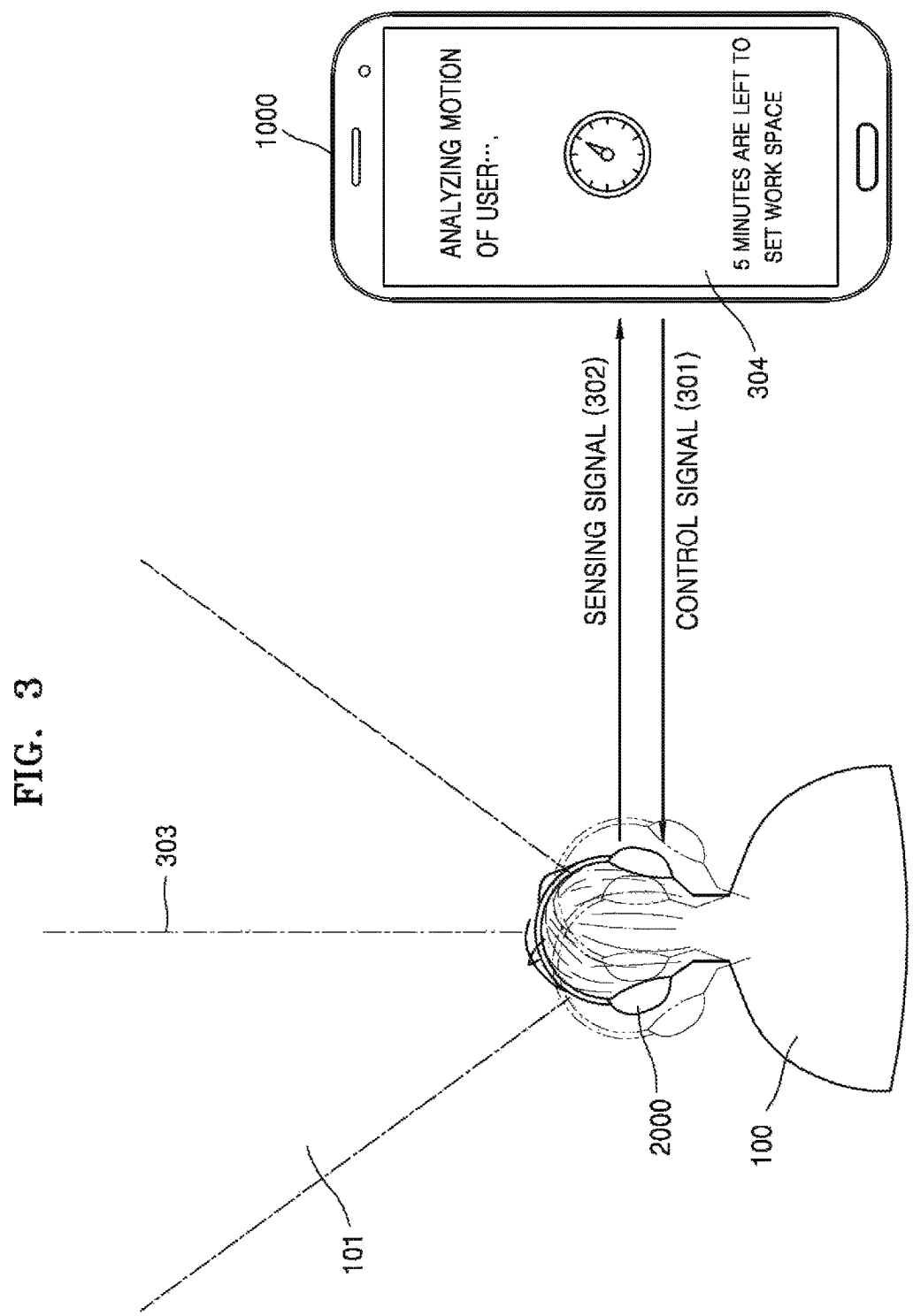
FIG. 3 illustrates a method of setting a main work space via an electronic device, according to an exemplary embodiment.

FIG. 3 illustrates a method of setting the main work space 101 through the electronic device 1000, according to an exemplary embodiment.

The electronic device 1000 may execute an application that provides a noise control function or software that provides a noise control function. The electronic device 1000 may be an electronic device that autonomously performs a noise control function. After the noise control function is executed, the electronic device 1000 may automatically perform an operation of determining the main work space 100 for a preset time. The preset time may include a time corresponding to a time within several minutes (e.g., a time within 5 minutes after executing an application) after executing the noise control function.

Referring to FIG. 3, the electronic device 1000 may analyze a motion of the user 100 for a time within 5 minutes after executing the noise control function so as to determine the main work space 101. The wearable device 2000 worn by the user 100 may include the sensor 2020 that may sense the motion of the user 100. The sensor 2020 of the electronic device 2000 may include the gyroscope sensor 2021, the acceleration sensor 2022, and the camera 2023.

The electronic device 1000 transmits a control signal 301 for controlling to sense the motion of the user 100 to the wearable device 2000. If the wearable device 2000 receives the control signal 301 from the electronic device 1000, the wearable device 2000 may sense a facing direction of the face of the user 100 through the gyroscope sensor 2021. The wearable device 2000 may transmit a sensing signal 302 sensed by the gyroscope sensor 2021 to the electronic device 1000. The wearable device 2000 may generate a sensing signal of the facing direction of the face of the user 100 by using the gyroscope sensor 2021, the acceleration sensor 2022, or the camera 2023.

The electronic device 1000 may analyze the sensing signal 302 received from the wearable device 2000 to determine the main work space 101. The electronic device 1000 may analyze the sensing signal 302 to determine a space, which is located within a preset range in a direction 303 toward which the face of the user 101 heads for a preset time, as the main work space 101. The preset range may include a range within a preset distance or a preset angle from a place where the face of the user 100 heads toward the direction 300 for the preset time but is not limited thereto.

The electronic device 1000 may automatically perform the operation of determining the main work space 101 and display 304 a sentence for notifying the user 101 that the main work space 101 is being set.

Figure 4:
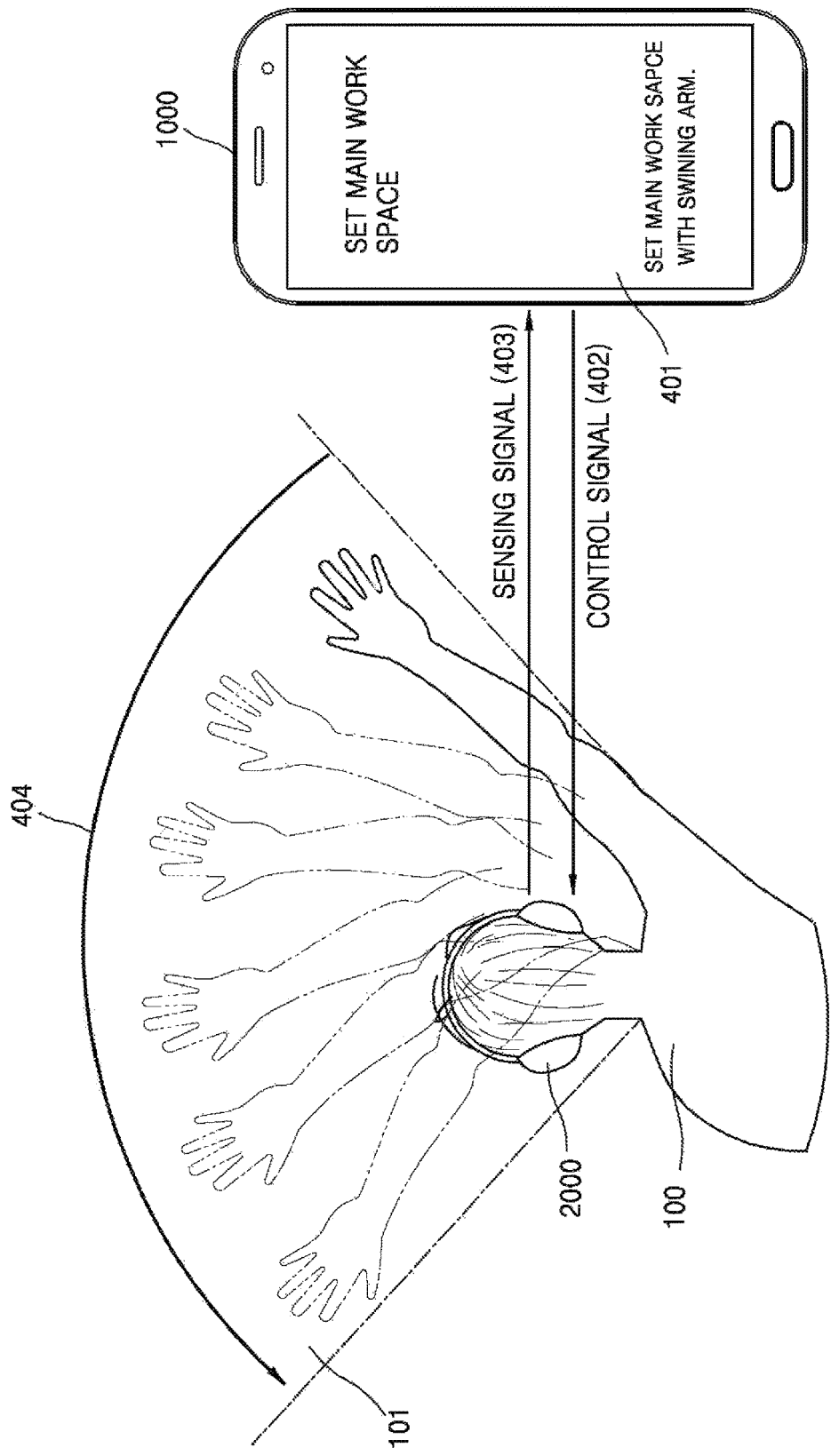
FIG. 4 illustrates a method of setting a main work space based on an input of a user to an electronic device, according to an exemplary embodiment.

FIG. 4 illustrates a method of setting the main work space 101 based on an input of the user 100 through the electronic device 1000, according to an exemplary embodiment.

The electronic device 1000 may include the user input unit 1100 for setting the main work space 100. The electronic device 1000 may receive an input of the user 100 for setting a space, which is located within a preset range from the electronic device 100, as the main work space 10 through the user input unit 1100.

The electronic device 1000 may display a sentence, which enables the user 100 to perform a preset operation so as to determine the main work space 101, through the display 1210. For example, the electronic device 1000 may display 401 a sentence "Please, move your arm to set a main work space." to the user 100.

The wearable device 2000 includes the sensor 2020 that may sense a motion of the user 100. The electronic device 1000 may transmit a control signal 402 for controlling to sense a preset motion of the user 100 to the wearable device 2000. The wearable device 2000 may receive the control signal 402 for controlling to sense the preset motion of the user 100 from the electronic device 1000. If the wearable device 2000 receives the control signal 402 from the electronic device 1000, the sensor 2020 of the wearable device 2000 may sense the preset motion of the user 100. For example, the preset motion of the user 100 may include a motion of the user 100 who swings an arm. However, the preset motion of the user 100 is not limited thereto and thus may include other motions such as a motion of the user 100 who rotating the head, etc.

Referring to FIG. 4, the user 100 may swing a right arm from a right direction to a left direction 404 to set a space corresponding to the main work space 101. The wearable device 2000 may sense a motion of the arm of the user 100 by using the sensor 2020. The wearable device 2000 may sense the motion of the arm of the user 100 through the sensor 2020 to generate a sensing signal 403. The wearable device 2000 may transmit the sensing signal 403 to the electronic device 1000. The electronic device 1000 may analyze the received sensing signal 403 to set a space, which is set by the user 100 by swinging the arm, to the main work space 101.

The electronic device 1000 may set the main work space 101 whenever executing a noise control function. Therefore, a noise control, which is more flexible than a physical separation of a space that is permanent and is difficult to be changed, may be possible.

The electronic device 1000 may determine the sub work space 102 from work spaces of the user 100 except the main work space 101. The electronic device 1000 may determine the sub work space 102 by using the same method as that of determining the main work space 101.

Figure 5:
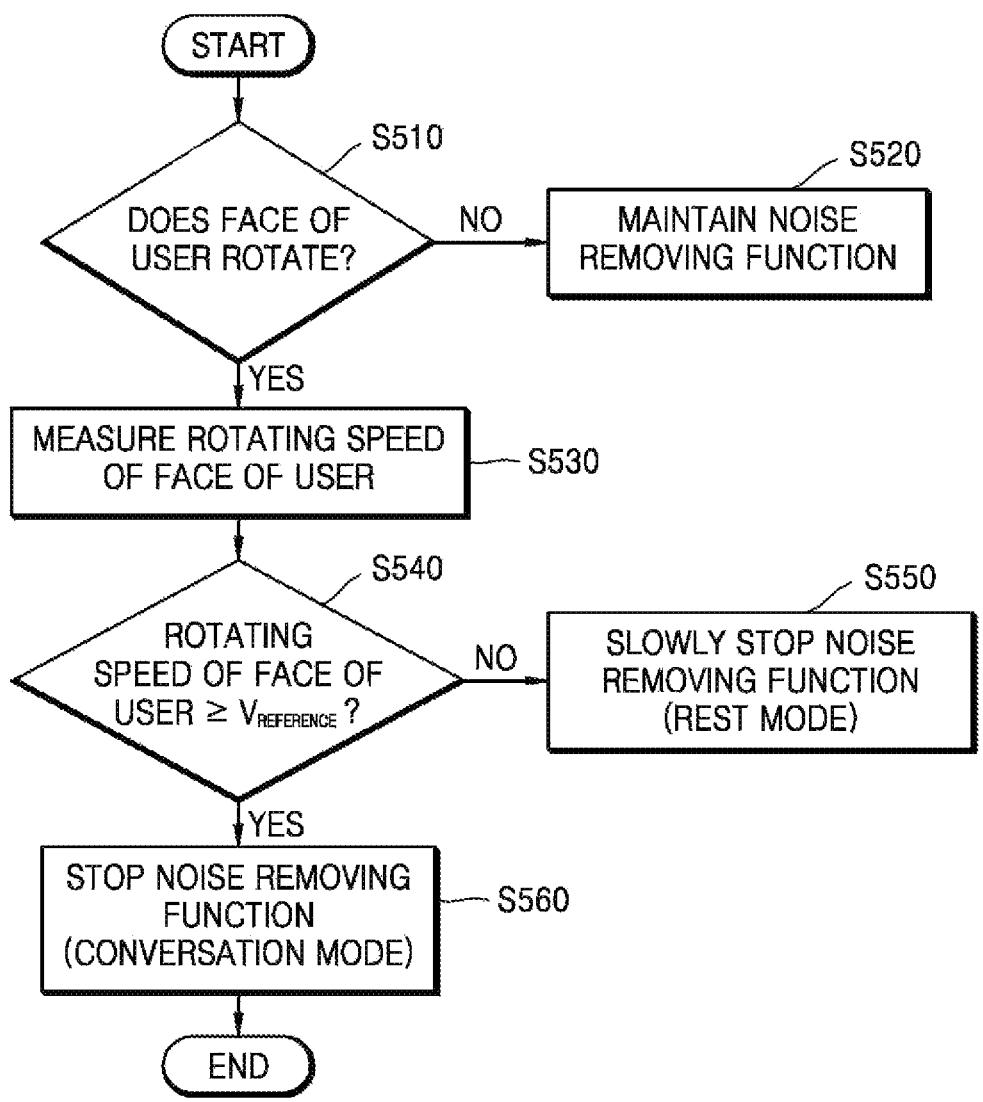
FIG. 5 is a flowchart of a method of controlling noise in a work space according to a work state of a user by using an electronic device, according to an exemplary embodiment.

FIG. 5 is a flowchart of a method of controlling noise in a work space according to a work state of the user 100 through the electronic device 1000, according to an exemplary embodiment.

The wearable device 2000 may sense a motion of the face of the user 100 through the sensor 2020. If the wearable device 200 senses the motion of the face of the user 100, the wearable device 2000 may transmit a sensing signal to the electronic device 1000. The electronic device 1000 may analyze the received sensing signal to determine whether the face of the user 100 rotates in operation S510.

If it is determined that the face of the user 100 does not rotate, the electronic device 1000 may maintain a noise removing function through outputting of a sound for offsetting noise around the user 100. If it is determined that the face of the user 100 rotates, the electronic device 1000 may transmit a control signal, which controls to measure a rotating speed of the face of the user 100, to the wearable device 2000.

The wearable device 2000 may sense the rotating speed of the face of the user 100 through the sensor 2020. The wearable device 2000 may sense the rotating speed of the face of the user 100 to transmit a sensing signal to the electronic device 1000. The electronic device 1000 may receive the sensing signal generated by sensing the rotating speed of the face of the user 100 from the wearable device 2000. The electronic device 1000 may analyze the sensing signal to determine whether the rotating speed of the face of the user 100 is higher than or equal to a reference rotating speed V in operation S540.

The reference rotating speed V is set by the user 100 and may be a value pre-stored in the electronic device 1000. If the rotating speed of the face of the user 100 is lower than the reference rotating speed V, the electronic device 1000 may determine a work state of the user 100 as a rest state. If the work state of the user 100 is determined as the rest state, the electronic device 1000 may slowly stop a function of removing noise around the user 100 in operation S550. If the user 100 is in the rest state, a noise control for increasing work efficiency may be unnecessary.

If it is determined that the rotating speed of the face of the user 100 is higher than or equal to the reference rotating speed V, the electronic device 1000 may determine the work state of the user 100 as a sub work state. If the work state of the user 100 is determined as the sub work state, the electronic device 1000 may stop the function of removing surrounding noise in operation S560. The electronic device 1000 may stop the function of removing the surrounding noise so as to enable the user 100 to have a conversation with a conversation person 3000 located in the sub work space 102.

Figure 6:
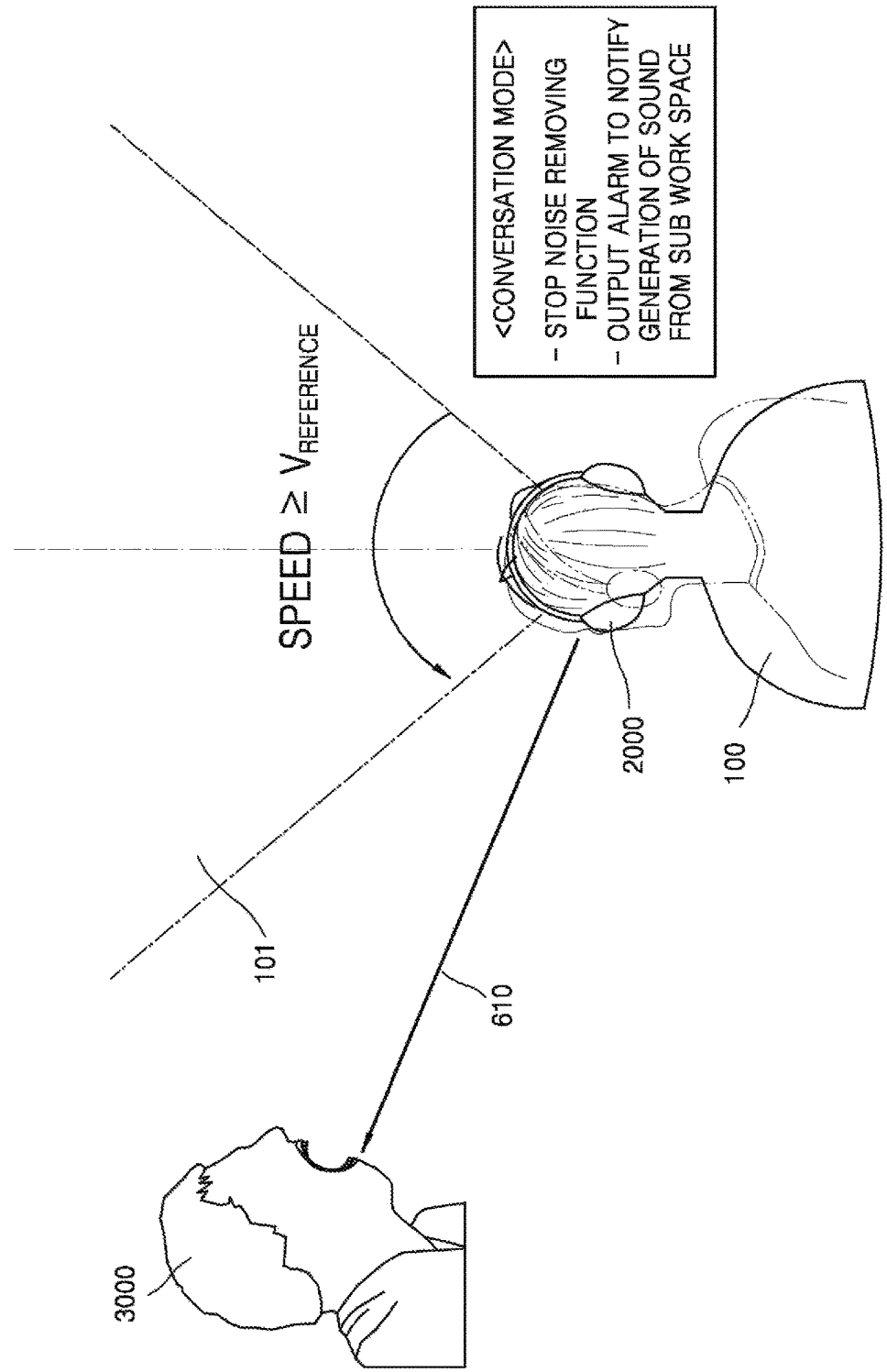
FIG. 6 illustrates a method of sensing a rotation speed of a head of a user to control noise in a work space by using an electronic device, according to an exemplary embodiment.

FIG. 6 illustrates a method of sensing a rotating speed of a head of the user 100 to control noise in a work space through the electronic device 1000, according to an exemplary embodiment.

The electronic device 1000 may include a plurality of microphones 1620. The electronic device 1000 may determine a direction from which a received sound is generated, by using the plurality of microphones 1620. If the received sound is generated in the sub work space 102, the electronic device 1000 may output an alarm to the user 100. The electronic device 1000 may also transmit a signal for outputting the alarm to the user 100 to the wearable device 2000.

Also, a plurality of microphones may be included in the wearable device 2000. The wearable device 2000 may transmit a sound signal, which is sensed by the plurality of microphones, to the electronic device 1000. The electronic device 100 may analyze the sound signal received from the wearable device 2000 to determine a direction from which a sound is generated.

For example, when the user 100 performs a work, the colleague or the superior officer 3000 of the user 100 may attempt to have a conversation with the user 100. In this case, the electronic device 1000 may output an alarm to the user 100 to notify the user that a sound is received from the colleague or the superior officer 3000.

If the user 100 listens to the alarm, the user 100 may rotate the face toward a sub work space direction 610. The sensor 2020 of the wearable device 2000 may sense a rotating speed of the face of the user 100. The wearable device 2000 may transmit a sensing signal to the electronic device 1000. The electronic device 1000 may analyze the received sensing signal to determine whether the rotating speed of the face of the user 100 is higher than or equal to a reference rotating speed V. If it is determined that the rotating speed of the face of the user 100 is higher than or equal to the reference rotating speed V, the electronic device 1000 may determine a work state of the user 100 as a sub work state (a conversation mode). This is because the user 100 quickly rotates toward a direction from which sound is heard in most cases where someone calls the user 100. If the work state of the user 100 is determined as the sub work state (the conversation mode), the electronic device 1000 may stop a noise control function so as to enable the user 100 to have a conversation with the conversation person 3000 located in the sub work space 102.

The electronic device 1000 may set the sub work space 102 and output an alarm if a sound is received in the sub work space 102, to remove noise around the user 100 so as to increase work efficiency and receive a sound necessary for a work of the user 100. In other words, the electronic device 1000 may enable the user 100 to receive a selective sound.

Figure 7:
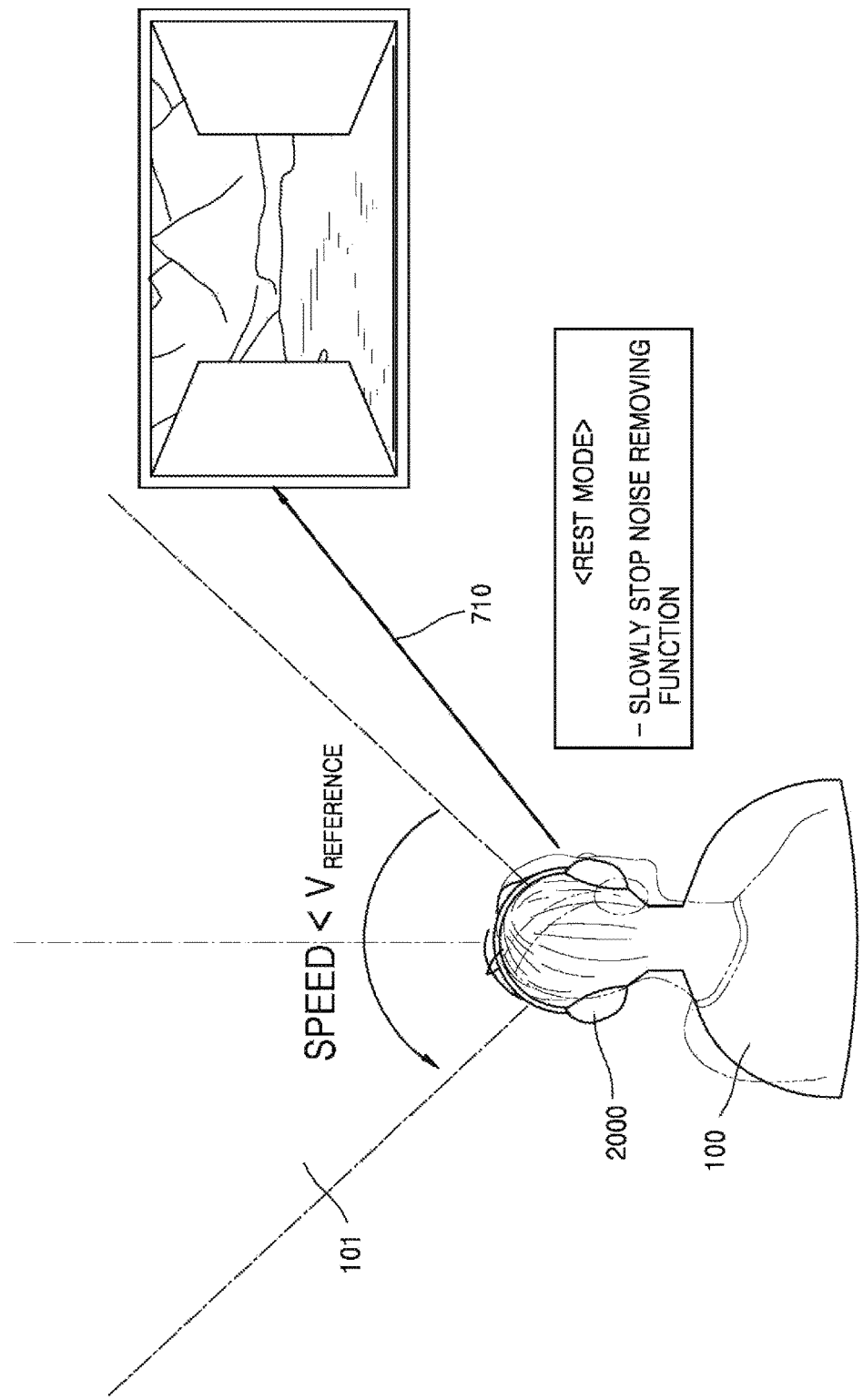
FIG. 7 illustrates a method of sensing a rotation speed of a head of a user to control noise in a work space by using an electronic device, according to an exemplary embodiment.

FIG. 7 illustrates a method of sensing a rotating speed of the head of the user 100 to control noise in a work space through the electronic device 1000, according to an exemplary embodiment.

The sensor 2020 of the wearable device 2000 may sense a rotating speed of the face of the user 100. The wearable device 2000 may sense the rotating speed of the face of the user 100 to transmit a sensing signal to the electronic device 1000. The electronic device 1000 may analyze the sensing signal to determine a work state of the user 100 as a rest state if it is determined that the rotating speed of the face of the user 100 is lower than the reference rotating speed V.

For example, the user 100 may be in a main work state and then slowly rotate the face toward a window direction 710 to look out the window located outside the main work space 101. If the electronic device 1000 determines the work state of the user 100 as the rest state, the electronic device 1000 may slowly stop a noise removing function.

If the user 100 is in the rest state, the electronic device 1000 may stop the noise removing function unnecessary for the rest state of the user 100 so as to enable a noise control according to the work state of the user 100.

Figure 8:
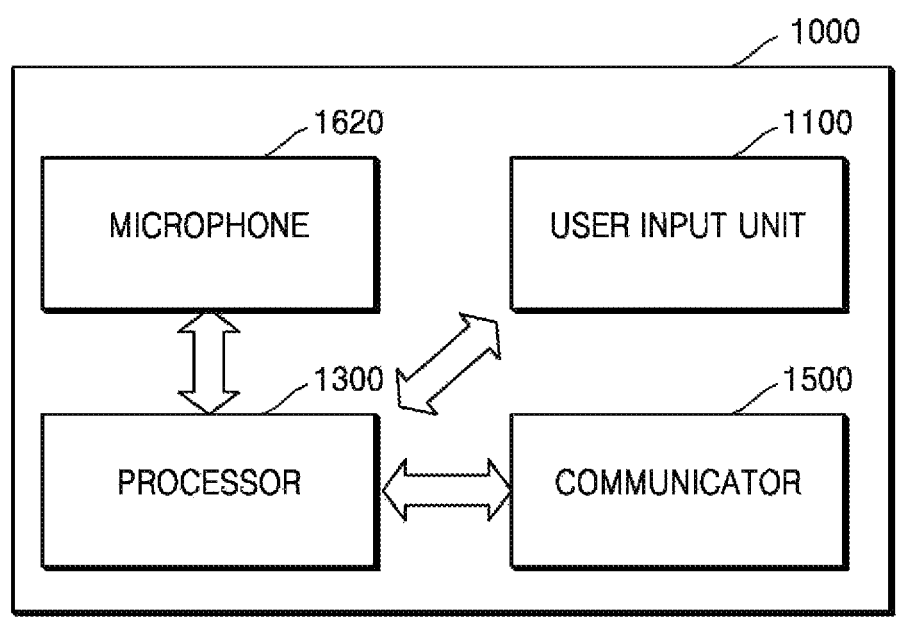
FIG. 8 is a block diagram of an electronic device according to an exemplary embodiment.
Figure 9:
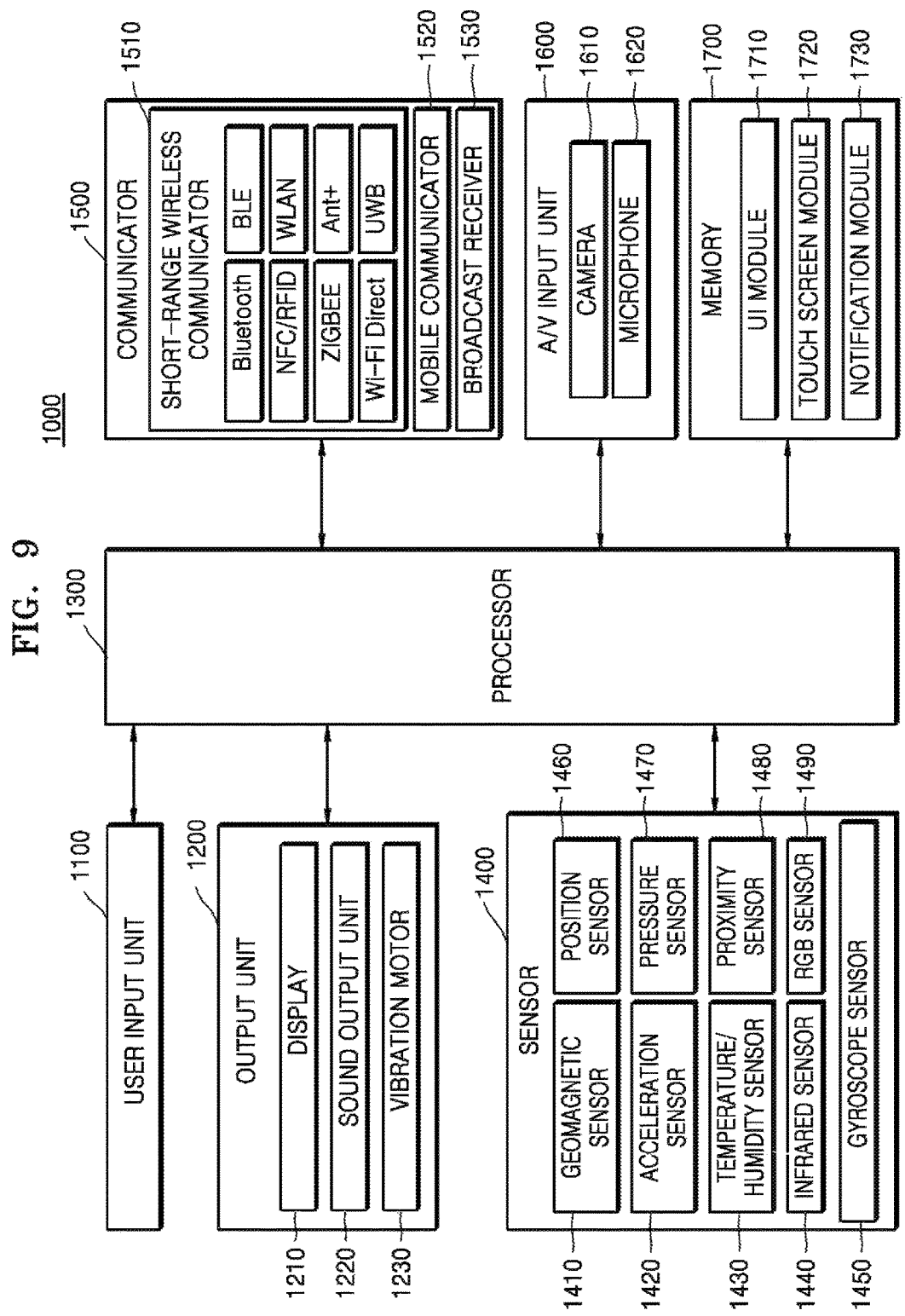
FIG. 9 is a block diagram of an electronic device according to an exemplary embodiment.

FIGS. 8 and 9 are block diagrams of the electronic device 1000, according to an exemplary embodiment.

As shown in FIG. 8, the electronic device 1000 according to some exemplary embodiments may include the microphone 1620, the user input unit 1100, a processor 1300, and a communicator 1500. However, all elements illustrated in FIG. 8 are not essential elements of the electronic device 1000. The electronic device 1000 may be realized by the larger number of elements than the elements of FIG. 8 or by the smaller number of elements than the elements of FIG. 8.

For example, as shown in FIG. 9, the electronic device 1000 according to some exemplary embodiments may further include an output unit 1200, a sensor 1400, and a memory 1700.

An Audio/Video (A/V) input unit 1600 is used to input an audio signal or a video signal and may include a camera 1610, the microphone 1620, etc. The camera 1610 may acquire an image frame, such as a still image, a moving image, or the like, through an image sensor in a video call mode or a capturing mode. An image that is captured through the image sensor may be processed through the processor 1300 or an additional image processor.

The image frame that is processed in the camera 1610 may be stored in the memory 1700 or may be transmitted to an outside through the communicator 1500. Two or more cameras 1610 may be included according to a configuration of a terminal.

The microphone 1620 receives an external sound signal and processes the eternal sound signal as voice data. For example, the microphone 1620 may receive a sound signal from an external device or a speaker. The microphone 1620 may use various types of noise removing algorithms for removing noise occurring in a process of receiving the external sound signal.

The microphone 1620 may sense noise in a work space to which the user 100 belongs. The microphone 1620 may sense the noise in the work space, to which the user 100 belongs, to generate noise data. The microphone 1620 may transmit the noise data to the processor 1300 to analyze the generated noise data.

The electronic device 1000 may include a plurality of microphones 1620. The electronic device 1000 may sense a sound in the work space, to which the user 100 belongs, by using the plurality of microphones 1620. The plurality of microphones 1620 may sense a sound to generate sound data. The plurality of microphones 1620 may transmit the sound data to the processor 1300 to determine a direction from which the sound is generated.

The processor 1300 controls an overall operation of the electronic device 1000. For example, the processor 1300 may execute programs stored in the memory 1700 to control the user input 1100, the output unit 1200, the sensor 1400, the communicator 1500, the A/V input unit 1600, etc.

In detail, the processor 1300 may control the microphone 1620 to sense noise in the work space to which the user 100 belongs. The processor 1300 may receive the noise data generated by the microphone 1620. The processor 1300 may analyze the noise data to generate a sound having an opposite phase to a signal waveform of noise.

The processor 1300 may perform a control for determining the main work space 101. In detail, the processor 1300 may control the communicator 1500 to transmit a control signal for sensing a facing direction of the face of the user 100 to the wearable device 2000. The processor 1300 may control the communicator 1500 to receive a sensing signal generated through the sensor 2020 of the wearable device 200. The processor 1300 may analyze the received sensing signal to determine the main work space 101. The processor 1300 may control a display 1210 to display a sentence for notifying the user 100 that the main work space 101 is being set (refer to 304 of FIG. 3).

The processor 1300 may control the user input unit 1100 to receive a user input for the main work space 101. The processor 1300 may analyze a user input signal received through the user input unit 1100 to determine a space, which is in a preset range from a location of the electronic device 1000, as the main work space 101.

The processor 1300 may control the display 1210 to display a sentence for enabling the user 100 to perform a preset operation to determine the main work space 101. The processor 1300 may control the communicator 1500 to transmit a control signal for controlling to sense a motion of the user 100 to the wearable device 2000. The processor 1300 may control the communicator 1500 to receive a sensing signal that is generated by sensing the preset motion of the user 100 through the wearable device 2000. The processor 1300 may analyze the received sensing signal. The processor 1300 may analyze the sensing signal to determine a space marked with a preset motion by the user 100 as the main work space 101.

The processor 1300 may control the memory 1700 to store information about the determined main work space 101. The processor 1300 may control the electronic device 1000 to determine the main work space 101 so as to provide a noise control function if the user 100 heads toward the main work space 101 to perform a work.

The processor 1300 may determine the sub work space 102 from work spaces of the user 100 except the main work space 101. The processor 1300 may determine the sub work space 102 by using the same method as that of determining the main work space 101. The processor 1300 may control the memory 1700 to store information about the determined sub work space 102.

The processor 1300 may control the microphone 1620 to sense noise in the space to which the user 100 belongs. The processor 1300 may receive and analyze generated noise data. The processor 1300 may analyze the noise data to generate a sound having an opposite phase to a surrounding noise waveform. The processor 1300 may control the communicator 1500 to transmit a sound to the wearable device 2000 to output a sound so as to offset surrounding noise. The processor 1300 may also control the output unit 1200 so as to enable the electronic device 1000 to output the sound.

The processor 1300 may determine a work state of the user based on at least one selected from a facing direction of the face of the user 100, a rotating speed of the face of the user 100, and whether the user 100 moves. The processor 1300 may determine the work state of the user 100 to perform a noise control according to the work state of the user 100.

The processor 1300 may generate a control signal for controlling the sensor 2020 of the wearable device 2000 to sense at least one selected from the facing direction of the face of the user 100 and the rotating speed of the face of the user 100. The processor 1300 may control the communicator 1500 to transmit the control signal to the wearable device 2000. The processor 1300 may control the communicator 1500 to receive a sensing signal generated by the sensor 2020 of the wearable device 2000 from the wearable device 2000. The processor 1300 may analyze the sensing signal to determine a work state of the user 100 as a main work state if it is determined that the face of the user 100 heads toward the main work space 101. If the work state of the user 100 is determined as the main work state, the processor 1300 may control the communicator 1500 to transmit a sound for offsetting noises around the user 100 to the wearable device 2000. If it is determined that the face of the user 100 heads toward the sub work space 102 or if it is determined that the face of the user 100 rotates toward the sub work space 102 at a speed higher than or equal to a reference rotating speed V, the processor 1300 may determine the work state of the user as a sub work state. If the work state of the user 100 is determined as the sub work state (or a conversation mode), the processor 1300 may control to stop an operation of outputting a sound for offsetting surrounding noise. If it is determined that the face of the user 100 heads toward a space except the main work space 101 and the sub work space 102 or if it is determined that the face of the user 100 rotates toward the space except the main work space 101 and the sub work space 102 at a speed lower than the reference rotating speed V, the processor 1300 may determine the work state of the user 100 as a rest state. If the work state of the user 100 is determined as the rest state, the processor 1300 may control to slowly stop outputting the sound for offsetting the surrounding noise.

The processor 1300 may receive sound data through the plurality of microphones 1620 of the electronic device 1000 or a plurality of microphones of the wearable device 2000. The processor 1300 may analyze the received sound data. The processor 1300 may analyze the sound data to determine a direction from which a sound is generated. If it is determined that the sound is generated in the space determined as the sub work space 102, the processor 1300 may generate a control signal for outputting an alarm. The processor 1300 may control the communicator 1500 to transmit the control signal for outputting the alarm to the wearable device 2000. The processor 1300 may also control a sound output unit 1220 so as to enable the sound output unit 1220 of the electronic device 1000 to directly output the alarm.

The user input unit 1100 may receive a user input for setting the main work space 101. The user input unit 1100 may receive a user input for setting the sub work space 102. The user input unit 1100 may transmit an input signal received from the user 100 to the processor 1300.

The communicator 1500 may include one or more elements that enable communications with the wearable device 2000 and an external device.

For example, the communicator 1500 may include a short-range wireless communicator 1510, a mobile communicator 1520, and a broadcast receiver 1530.

The short-range wireless communicator 151 may include a Bluetooth communicator, a Bluetooth Low Energy (BLE) communicator, a near field communication (NFC) unit, a wireless LAN (Wi-Fi) communicator, a Zigbee communicator, an Infrared Data Association (IrDA) communicator, a Wi-Fi Direct (WFD) communicator, an ultra-wideband (UWB) communicator, an Ant+ communicator, etc. but is not limited thereto.

The mobile communicator 1520 may transmit and receive a wireless signal with at least one selected from a base station, an external terminal, and a server on a mobile communication network. Here, the wireless signal may include various types of data that are generated by transmitting and receiving a voice call signal, a video call signal, or letters and/or multimedia messages.

The broadcast receiver 1530 receives a broadcast signal and/or broadcast-related information from an external source through a broadcast channel. The broadcast channel may include a satellite channel and a terrestrial channel. The electronic device 1000 may not include the broadcast receiver 1530.

The communicator 1500 may enable the sensor 2020 of the wearable device 2000 to transmit a control signal for sensing a motion of the user 100 to the wearable device 2000. The communicator 1500 may receive a sensing signal from the wearable device 2000. The communicator 1500 may transmit the received sensing signal to the processor 1300. The communicator 1500 may transmit a sound to the wearable device 2000 so as to enable the wearable device 2000 to output the sound generated by the processor 1300. The communicator 1500 may transmit a control signal for outputting a generated alarm to the wearable device 2000.

The output unit 1200 may output an audio signal, a video signal, or a vibration signal and include the display 1210, the sound output unit 1220, and a vibration motor 1230.

The display 1210 outputs information processed in the electronic device 1000. For example, the display 1210 may output a guide sentence of a determination of the main work space 101 to the user 100 in an operation of determining the main work space 101.

The sound output unit 1220 outputs audio data that is received from the communicator 1500 or stored in the memory 1700. The sound output unit 1220 outputs a sound signal related to a function (e.g., a call signal receiving sound, a message receiving sound, an alarm sound, or the like) performed in the electronic device 1000. The sound output unit 1220 may include a speaker, a buzzer, or the like.

The vibration motor 1230 may output a vibration signal. For example, the vibration motor 1230 may output a vibration signal corresponding to an output of audio data or video data (e.g., a call signal receiving sound, a message receiving sound, or the like). The vibration motor 1230 may also output the vibration signal if a touch is input onto a touch screen.

The memory 1700 may store a program, etc. necessary for an operation of the electronic device 1000. The memory 1700 may store information about the main work space 101 determined by the processor 1300. The memory 1700 may store information about the sub work space 102 determined by the processor 1300.

The memory 1700 may include at least one type of storage medium selected from a flash memory type, a hard disk type, a multimedia card micro type, a card type memory (e.g., an SD or XD memory or the like), a random access memory (RAM), a static RAM (SRAM), a read only memory (ROM), an electrically erasable programmable ROM (EEPROM), a programmable ROM (PROM), a magnetic memory, a magnetic disk, and an optical disk.

Programs stored in the memory 1700 may be classified into a plurality of modules, e.g., may be classified into a user interface (UI) module 1710, a touch screen module 1720, a notification module 1730, etc.

The UI module 1710 may provide a UI, a graphical user interface (GUI), etc. that are specialized and operate along with the electronic device 1000 according to applications. The touch screen module 1720 may sense a touch gesture on a touch screen of a user and transmit information about the touch gesture to the processor 1300. The touch screen module 1720 according to some exemplary embodiments may recognize and analyze a touch code. The touch screen module 1720 may be formed of additional hardware including a controller.

Various types of sensors may be included in or around a touch screen to sense a touch or a proximity touch on the touch screen. There is a haptic sensor as an example of a sensor for sensing a touch on the touch screen. The haptic sensor refers to a sensor that senses a contact of a particular object at a degree or more felt by a human. The haptic sensor may sense various types of information such as roughness of a contacting surface, hardness of a contacting object, a temperature of a contacting point, etc.

Also, there is a proximity sensor as an example of a sensor for sensing a touch on a touch screen.

The proximity sensor refers to a sensor that detects an object approaching a preset detection surface or whether an object exists around the preset detection surface, without a mechanical contact by using a force of an electromagnetic field or infrared rays. Examples of the proximity sensor include a transmission type photoelectric sensor, a direct reflective type photoelectric sensor, a mirror reflective type photoelectric sensor, a high-frequency oscillation-type proximity sensor, a capacitive type proximity sensor, a magnetic type proximity sensor, an infrared proximity sensor, etc. Examples of the touch gesture include tap, touch & hold, double tap, drag, panning, flick, drag & drop, swipe, etc.

The notification module 1730 may generate a signal for notifying an event occurrence of the electronic device 1000. Examples of an event occurring in the electronic device 1000 include call signal receiving, message receiving, a key signal input, a schedule notification, etc. The notification module 1730 may output a notification signal in a video signal form through the display 1210, in an audio signal form through the sound output unit 1220, or in a vibration signal form through the vibration motor 1230.

The sensor 1400 may sense a state of the electronic device 1000 or a state around the electronic device 1000 and transmit sensed information to the processor 1300.

The sensor 1400 may include at least one selected from a magnetic sensor 1410, an acceleration sensor 1420, a temperature/humidity sensor 1430, an infrared sensor 1440, a gyroscope sensor 1450, a position sensor 1460 (e.g., a GPS), a pressure sensor 1470, a proximity sensor 1480, and an RGB illuminance sensor 1490 but is not limited thereto. Functions of these sensors may be intuitively inferred from their names by those of ordinary skill in the art, and thus their detailed descriptions are omitted.

Figure 10:
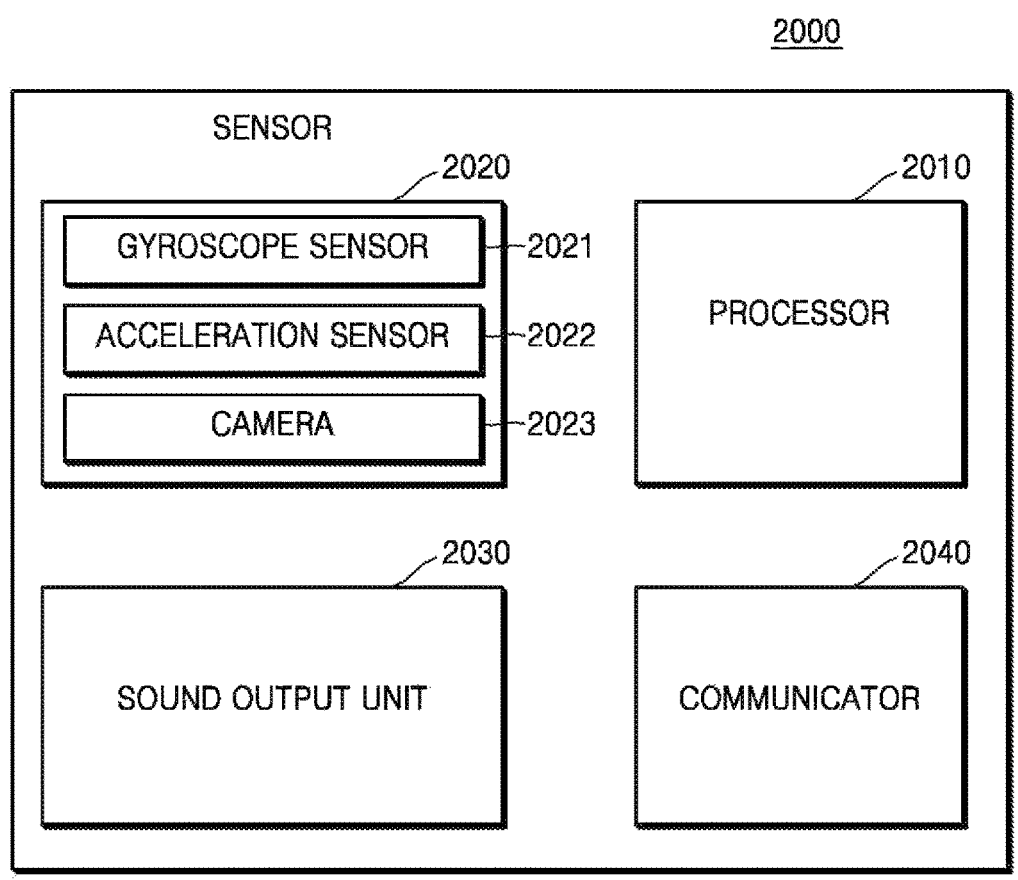
FIG. 10 is a block diagram of a wearable device according to an exemplary embodiment.

FIG. 10 is a block diagram of the wearable device 2000, according to an exemplary embodiment.

As shown in FIG. 10, the wearable device 2000 according to some exemplary embodiments may include a processor 2010, the sensor 2020, a sound output unit 2030, and a communicator 2040. All of elements illustrated in FIG. 10 are not essential elements of the wearable device 2000. The wearable device 2000 may be realized by the larger number of elements than the elements of FIG. 10 or by the smaller number of elements than the elements of FIG. 10.

The processor 2010 controls an overall operation of the wearable device 2000. For example, the processor 2010 may control the sensor 2020, the sound output unit 2030, and the communicator 2040.

In detail, the processor 2010 may control the sensor 2020 to sense a motion of the user 100 based on a control signal received from the electronic device 1000. The processor 2010 may control the communicator 2040 to transmit a sensing signal received from the sensor 2020 to the electronic device 1000.

The processor 2010 may control the sound output unit 2030 to output a received sound or alarm based on a control signal for outputting a sound or an alarm received from the electronic device 1000.

The sensor 2020 may include the gyroscope sensor 2021, the acceleration sensor 2022, and the camera 2023 but is not limited thereto. Functions of these sensors may be intuitively inferred from their names by those of ordinary skill in the art, and thus their detailed descriptions are omitted.

If a control command for sensing a motion of the user 100 is received from the processor 2010, the sensor 2020 may sense a motion of the user 100 including a rotating direction and a rotating speed of the face of the user 100 and a motion direction and a motion location of an arm of the user 100 for a time when the user 100 wears the wearable device 2000. The sensor 2020 may transmit a sensing signal generated by sensing the motion of the user 100 to the processor 2010.

The sound output unit 2030 may output an alarm according to a control signal for outputting a sound or an alarm received from the electronic device 1000. The sound output unit 2030 may also output an output signal generated by the processor 2010 of the wearable device 2000.

The communicator 2040 may include at least one or more elements that enable communications between the wearable device 2000 and the electronic device 1000 or between the wearable device 2000 and an external device.

For example, the communicator 2040 may receive a control signal for an operation of the sensor 2020 from the electronic device 1000. The communicator 2040 may receive a sound for offsetting noise around the user 100 from the electronic device 1000. The communicator 2040 may receive a control signal for outputting an alarm notifying that a sound is generated in the sub work space 102, from the user 100. The communicator 2040 may transmit a sensing signal sensed by the sensor 2020 of the wearable device 2000 to the electronic device 1000.

A method of determining the electronic device 1000, such as a mobile device, as a subject to control an output of the wearable device 20000 worn by the user 100 and removing noise around the user 100 has been described herein but is not limited thereto. The electronic device 1000 may be an HMD that may be worn by the user 100, i.e., may be a wearable device type. Here, the electronic device 1000 may autonomously generate and output a sound for offsetting surrounding noise without an additional wearable device to control noise.

As described above, in an electronic device and a method of controlling noise by using the electronic device according to the exemplary embodiments, a work space where the user 100 is located may be divided into and set to the main work space 101, the sub work space 102, and other spaces. The electronic device 1000 may enable a noise control according to a space toward which the face of the user 100 heads. The electronic device 1000 may enable a noise control according to a work space through setting of a division of a space without physically separating the user 100 from a surrounding space.

The electronic device 1000 may remove noise around the user 100 and output an alarm to the user if a sound is received in the sub work space 102. Therefore, the electronic device 1000 may remove noise around the user 100 and enable communications between the user 100 and colleagues of the user 100. In other words, the electronic device 1000 may enable the user 100 to selectively receive a sound. A noise control function of the electronic device 1000 may enable more many users to share a work space so as to enable efficient space using.

The above-described exemplary embodiments may be written as computer readable programs and then embodied in general-purpose digital computers that operate the programs by using computer readable media. Also, a structure of data used in the exemplary embodiments may be recorded on a computer readable medium through several units. The above-described exemplary embodiments may be embodied as a recording medium type including computer executable commands like computer executable program modules. For example, methods that are embodied as software modules or algorithms may be recorded as computer readable and executable codes or program commands on a computer readable recording medium.

A computer readable medium may be an arbitrary recording medium that may be accessed by a computer and include volatile and nonvolatile media, and separable and inseparable media. Examples of the computer readable medium may include a magnetic storage medium (e.g., a ROM, a floppy disk, a hard disk, or the like) and an optical readable medium (e.g., a storage medium such as a CD-ROM, a DVD, or the like) but is not limited thereto. Also, the computer readable medium may include a computer storage medium and a communication medium.

Also, a plurality of computer readable recording media may be distributed in computer systems that are connected to one another through a network, and data stored in the distributed recording media, e.g., program commands and codes, may be executed by at least one computer.

Particular exemplary embodiments described above are merely exemplary and do not limit the range of the present disclosure. For conciseness of the specification, descriptions of existing electronic structures, control systems, software, and other functional sides of the above systems may be omitted.

The above descriptions are for examples, and thus it will be understood by those of ordinary skill in the art that the descriptions may be easily changed into other detailed forms without changing the spirit and essential features of this disclosure. Therefore, the above-described embodiments are exemplary in all aspects and are not to be construed as being limiting. For example, elements that are described in single forms may be distributed, and similarly, elements that are described as being distributed may be combined.

All examples or exemplary terms, e.g., "etc.", used herein are to simply describe exemplary embodiments. Therefore, the scope of the present disclosure is not limited by the examples or the exemplary terms as long as it is not limited by claims.

Also, if there is no detailed mention such as "essential", "importantly", or the like, elements described herein may not be elements necessary for the exemplary embodiments.

It will be understood by those of ordinary skill in the art that modifications may be made without departing from a fundamental feature of the description.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The terms "unit", "module", etc., as used herein, refer to a unit that processes at least one function or operation, and may be embodied as hardware, software, or a combination of hardware and software.

The terms "unit" and "module" may be embodied by a program that may be stored in an addressable storage medium and executed by a processor.

For example, the terms "unit" and "module" may be embodied by elements, such as software elements, object-oriented software elements, class elements, and task elements, processes, functions, attributes, procedures, sub routines, segments of a program code, drivers, firmware, a microcode, a circuit, data, a database (DB), data structures, tables, arrays, and parameters.

The description "A may include one selected from a1, a2, and a3," as used herein indicates that an exemplary element includable in element A is a1, a2, or a3.

An element that may configure element A is not limited to a1, a2, or a3 by the above description. Therefore, the element that may configure A should not be interpreted as a meaning excluding other elements that are not exemplary except a1, a2, and a3, i.e., as being exclusive.

The description that A may include a1, a2, or a3. The description does not mean that elements configuring A are selectively determined in a preset set. For example, the description should not be limitedly construed that a1, a2, or a3 selected from the set including a1, a2, and a3 configures component A.

Also, the description "at least one selected from a1, a2, and a3" used herein indicates one selected from "a1", "a2", "a3", "a1 and a2", "a1 and a3", "a2 and a3", and "a1, a2, and a3".

Therefore, as long as "at least one of a1, at least one of a2, and at least one of a3" are not explicitly described, the description "at least one selected from a1, a2, and a3" should not be interpreted as "at least one of a1", "at least one of a2", and "at least one of a3".

What is claimed is:

1. A method of controlling noise by an electronic device, the method comprising:
    determining a space, which is located within a range in a direction toward which a face of a user heads for a time, as a first space;
    setting an area as the first space for noise control;
    determining whether the user heads toward the first space;
    sensing noise around the user based on the determination of whether the user heads toward the first space; and
    providing a signal for offsetting the sensed noise based on the determination of whether the user heads toward the first space.

2. The method of claim 1, wherein the setting the area as the first space comprises:
    receiving a user input for setting the first space; and
    determining the first space based on the user input.

3. The method of claim 1, further comprising determining a work state of the user based on at least one among a facing direction of the user and a rotating speed of the user.

4. The method of claim 3, further comprising determining whether to output the signal for offsetting the sensed noise based on the determined work state of the user.

5. The method of claim 1, further comprising setting an area as a second space.

6. The method of claim 5, further comprising outputting an alarm in response to a second space sound being generated in the second space.

7. The method of claim 6, further comprising:
    sensing a sound using a plurality of microphones attached to a wearable device or the electronic device; and
    determining whether the sensed sound is the second space sound.

8. The method of claim 7, wherein the outputting the alarm is performed in response to determining the sensed sound is the second space sound.

9. The method of claim 1, further comprising requesting an output of the signal for offsetting the sensed noise from an external device.

10. An electronic device for controlling noise, the electronic device comprising:
    a microphone configured to sense noise around a user;
    a processor configured to determine a space, which is located within a range in a direction toward which a face of the user heads for a time, as a first space, set an area of the first space for noise control, determine whether the user heads toward the first space, and provide a signal for offsetting the sensed noise based on the determination of whether the user heads toward the first space; and a communicator configured to transmit the signal to a wearable device, wherein the microphone is configured to sense noise around the user based on the determination of whether the user heads toward the first space.

11. The electronic device of claim 10, further comprising:
a user input unit configured to receive a user input for setting the first space,
wherein the processor determines the first space based on the user input.

12. The electronic device of claim 10, wherein the processor determines a work state of the user based on at least one among a facing direction of the user and a rotating speed of the user.

13. The electronic device of claim 12, wherein the processor determines whether to output the signal for offsetting the sensed noise based on the determined work state of the user.

14. The electronic device of claim 10, further comprising a user input unit configured to receive a user input setting an area as a second space.

15. The electronic device of claim 14, wherein the communicator is further configured to transmit a signal outputting an alarm to the wearable device in response to a second space sound being generated in the second space.

16. The electronic device of claim 15, further comprising:
a plurality of microphones configured to sense the second space sound generated in the second space,
wherein the processor is further configured to determine whether the sensed sound is the second space sound.

17. The electronic device of claim 16, wherein the communicator transmits the signal outputting the alarm to the wearable device in response to determining the sensed sound is the second space sound.

18. The electronic device of claim 10, wherein the communicator requests an output of the signal for offsetting the sensed noise from an external device.

* * * * *